United States Patent
Benitez et al.

(10) Patent No.: US 11,840,012 B2
(45) Date of Patent: Dec. 12, 2023

(54) INJECTION-MOULDED PLASTIC COMPONENT AND METHOD FOR PRODUCING SUCH COMPONENTS

(71) Applicant: Magna Exteriors GmbH, Sailauf (DE)

(72) Inventors: Miguel Benitez, Mainhausen (DE); Wolfgang Funk, Schorndorf (DE); Klaus Münker, Griesstätt (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 0 days.

(21) Appl. No.: 17/898,502

(22) Filed: Aug. 30, 2022

(65) Prior Publication Data

US 2023/0077927 A1 Mar. 16, 2023

(30) Foreign Application Priority Data

Sep. 16, 2021 (DE) .......................... 102021210271.9

(51) Int. Cl.
*B29C 59/02* (2006.01)
*B29C 45/00* (2006.01)
*B29L 31/30* (2006.01)

(52) U.S. Cl.
CPC .......... *B29C 59/02* (2013.01); *B29C 45/0055* (2013.01); *B29L 2031/30* (2013.01)

(58) Field of Classification Search
None
See application file for complete search history.

(56) References Cited

U.S. PATENT DOCUMENTS 5,681,356 A * 10/1997 Barak .............. G06K 19/07724
264/272.17

FOREIGN PATENT DOCUMENTS

| DE | 19607855 C1 | * | 11/1996 | |
|----|----|----|----|----|
| DE | 19607855 C1 | | 11/1996 | |
| DE | 19732353 A1 | | 2/1999 | |
| DE | 19819761 A1 | | 11/1999 | |
| DE | 20010478 U1 | | 10/2000 | |
| DE | 19920941 A1 | | 11/2000 | |
| DE | 10314862 A1 | | 10/2004 | |
| DE | 102006022925 B4 | | 10/2009 | |
| WO | WO-2014000863 A2 | * | 1/2014 | ....... B29C 45/14065 |

* cited by examiner

*Primary Examiner* — Mohammad M Ameen
(74) *Attorney, Agent, or Firm* — Dickinson Wright PLLC

(57) ABSTRACT

A method for producing an injection-moulded plastic component made of a plastic having at least one recess for accommodating sensors, having the following steps: producing the injection-moulded plastic component in a mould having top and bottom mould halves; raising the top mould half and introducing a thermoregulatable ram which is guided in a sleeve; placing the sleeve with integrated annular space on the surface of the injection-moulded component, to form an annular bead in the annular space; pressing the thermoregulated ram into the surface of the injection-moulded component; and cooling the ram and raising it from the surface.

20 Claims, 2 Drawing Sheets

INJECTION-MOULDED PLASTIC COMPONENT AND METHOD FOR PRODUCING SUCH COMPONENTS

CROSS-REFERENCE TO RELATED APPLICATIONS

Figure 1A:
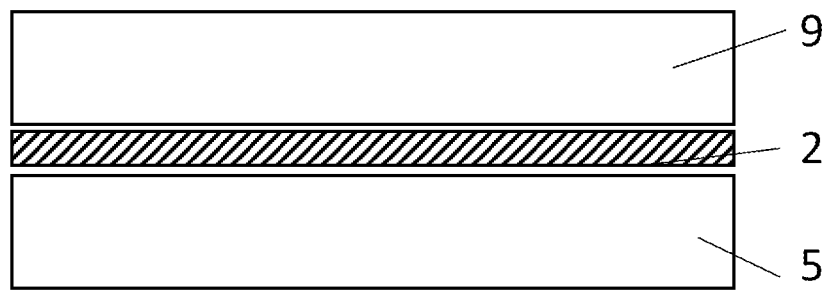

This application claims priority to German Application No. DE 102021210271.9 filed Sep. 16, 2021. The entire disclosure of the above application is incorporated herein by reference.

FIELD OF THE INVENTION

The invention relates to a method for producing injection-moulded plastic components having at least one mount for sensors, and to an injection-moulded plastic component.

BACKGROUND OF THE INVENTION

This section provides information related to the present disclosure which is not necessarily prior art.

Bodywork parts of motor vehicles have sensors installed in them that are used, for example, for measuring distance. Such sensors may be incorporated in a bumper at the front and/or back and during parking are able to detect the distance from an obstacle, a further vehicle. Systems of this kind are known as PDC sensors.

Known sensors of this kind are recessed into apertures in bumpers and are painted in one of the vehicle/bumper colours. An example of a PDC sensor recessed in a bodywork part, a bumper strip of a bumper, is shown by DE 103 14 862 A1. A disadvantage with a solution of this kind is the visibility of the sensors, even if their visible surface is painted in the bumper strip colour.

DE 200 10 478 U1 discloses a vehicle component where a securing element for a parking sensor is present on a bumper. The securing element comprises a connecting part and an installation housing which are produced from different plastics materials, by means of a two-component injection moulding process, for example, and are joined form-fittingly to one another. The function of the connecting part in this arrangement is to secure the entire securing element, together with the parking sensor used, on the bumper of a motor vehicle, particularly via a welded connection. The connecting part has a substantially cylindrical accommodating part on whose top edge there is a welding flange surrounding an opening. The parking sensor is arranged in this opening when it is accommodated in and fastened to the cylindrical installation housing.

DE 10 2006 022 925 B4 discloses a component which serves for accommodating sensors. The first constituent part of the component is produced from polycarbonate and forms a sheetlike outer part of the component, and the mount fixes the sensor on the inside of the first constituent part of the component. In this case both the first and the second constituent parts of the component are formed in the 2K injection moulding operation, with the second constituent part forming the mount of the sensor, thereby removing the need for an additional mounting part which would have to be assembled additionally.

Hot caulking is a process for joining two components of which at least one consists of thermoplastic material. Hot caulking exploits a doughy state adopted by thermoplastics when heat is supplied. The thermoplastics include, for example, polyethylene (PE), polypropylene (PP), polyvinyl chloride (PVC) and polycarbonate (PC). The process is also suitable for thermoplastics with a high glass fibre fraction. On heating, the material becomes soft and deformable. In this state it can be welded to the adjacent region or formed using a ram. This produces a durable form-fitting and force-fitting connection, which is sometimes also materially cohesive and which permits the transmission of forces and torques. Because plastics are poor thermal conductors and because the process has short durations of a few seconds, the increase in temperature is confined to a narrow spatial region.

DE 199 20 941 A1 shows a method for producing plastics parts having an embossed structure for three-dimensionally injection-moulded circuit carriers, by hot stamping of a conductor track structure from a foil onto an injection-moulded substrate. The operation of the injection moulding machine is such that the plastic part is injected in cycle 1 and at the same time in cycle 2 the stamping step is performed.

DE 198 19 761 A1 shows a device for separating a shaped substrate from an embossing tool with a pair of mutually adjustable chamber parts of a closable chamber, of which a first chamber part acts as a carrier for the embossing tool and a second chamber part acts as a carrier for the shapeable substrate. The chamber contains a substrate holder, which secures the substrate on its carrier outside the embossing region when the chamber is closed, so that when the chamber is opened the substrate is detached from the embossing tool. The second chamber part is formed by an annular projection of the substrate holder and not by the embossing die itself. The annular second chamber part is subjected to compressed air in order to facilitate demoulding of the substrate.

SUMMARY OF THE INVENTION

This section provides a general summary of the disclosure, and is not a comprehensive disclosure of its full scope or all of its features.

It is an object of the invention to produce a component which does without two-component injection moulding and nevertheless permits secure mounting of a sensor, with the outwardly visible surface of the component remaining undisturbed.

The object is achieved with a method for producing an injection-moulded plastic component made of a plastic having at least one recess for accommodating sensors by forming a bead on the surface of the injection-moulded plastic component, having the following steps: producing the injection-moulded plastic component in a mould having top and bottom mould halves; raising the top mould half and introducing a thermoregulatable ram which is guided in a sleeve; placing the sleeve with integrated annular space on the surface of the injection-moulded plastic component; pressing the thermoregulated ram into the surface of the injection-moulded plastic component to form an annular bead in the annular space by displacing melting material of the injection-moulded plastic component in the direction of the annular space; and cooling the ram and raising it from the surface.

The object is also achieved with a method where the press-in depth of the ram is not less than half the thickness of the injection-moulded plastic component.

The annular space is bounded by the surface of the injection-moulded component, the outer face of the sleeve, the boundary of the sleeve, and the outer casing of the ram.

The object is further achieved by an injection-moulded plastic component produced by the method.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
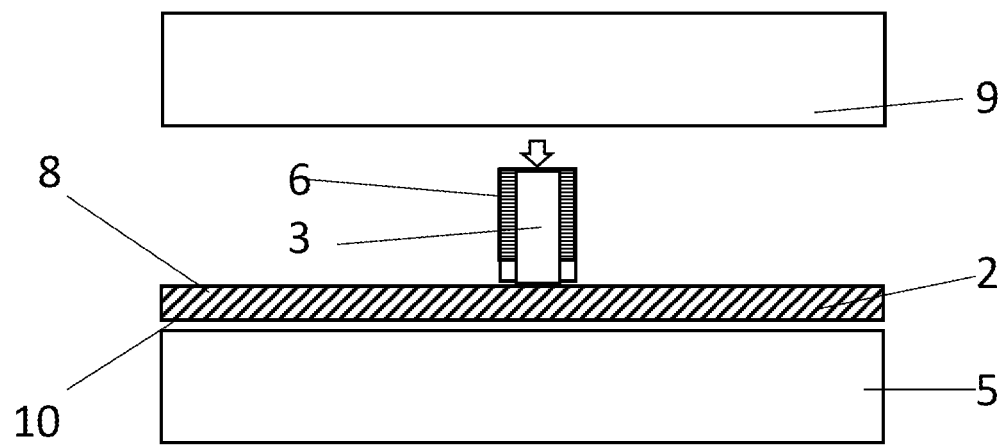
Figure 1C:
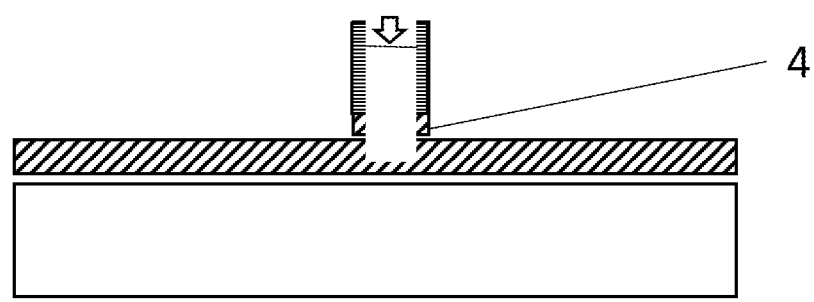

FIGS. 1a, 1b and 1c schematically shows production steps for a mount in a production plant for plastics injection moulding.

Figure 2:
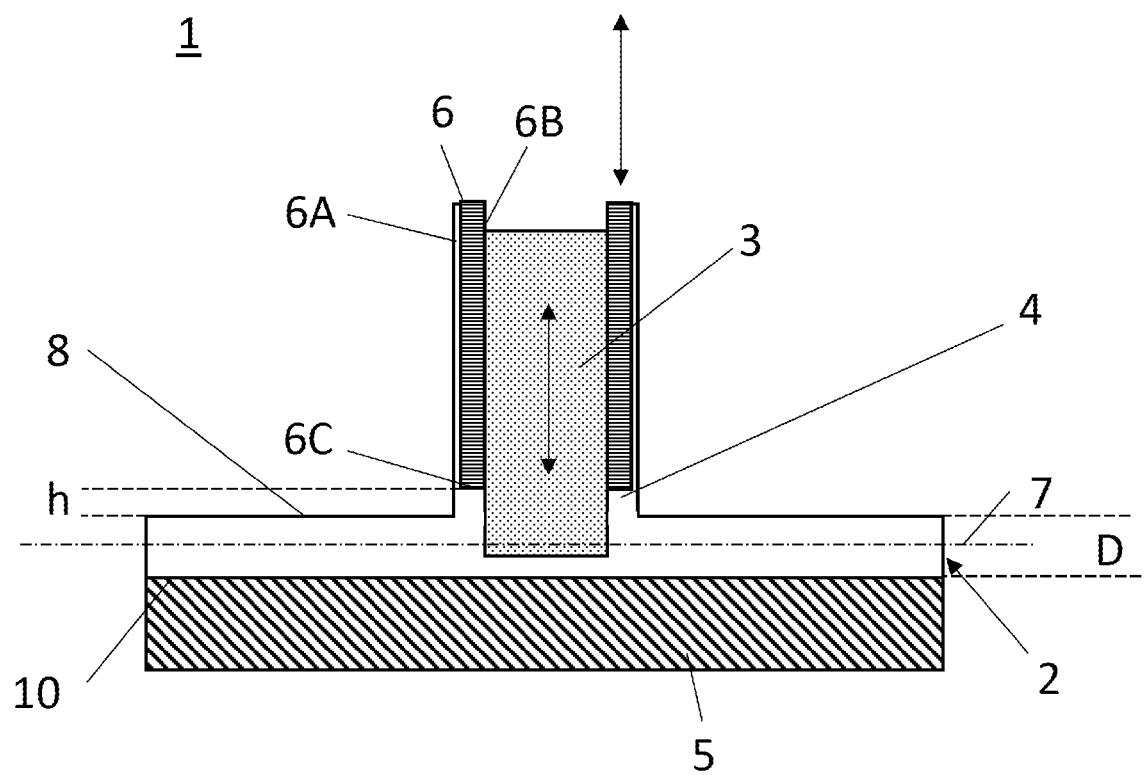

FIG. 2 shows details of the ram.

DESCRIPTION OF THE INVENTION

FIG. 1a schematically shows an injection mould which includes a bottom mould half 5 and a top mould half 9. The two mould halves 5, 9 form a cavity which determines the shape of the injection-moulded plastic component 2. The injection-moulded plastic component 2 is defined by the two inner surfaces of the two mould halves 5 and 9; the boundary edges are not further illustrated in the scheme shown.

After the production of the injection-moulded plastic component 2, the top mould half 9 is raised. The injection-moulded plastic component 2 remains lying on the bottom mould half 5 and can be thermoregulated via the underlying surface. It can, for example, be cooled more slowly than after complete demoulding. In order to produce a recess for the installation of a sensor, a thermoregulatable ram 3 is placed onto the surface 8 of the injection moulded component 2. The surface 8 is the side facing inwards in the vehicle. The thermoregulatable ram 3 is located in a sleeve 6, which is introduced into the injection moulding machine by a tool holder, not shown further.

The exact embodiment of the ram 3 and of the sleeve 6 is illustrated in FIG. 2. The sleeve 6 includes a cylinder having an outer face 6A and an inner face 6B. The sleeve 6 possesses a horizontal boundary 6C, which connects the inner face 6B to the outer face 6A. In this case the inner face 6B is shortened relative to the outer face 6A. The outer face 6A sits flush on the injection moulded component 2, whereas the inner face 6A is distanced by a certain height h from the surface of the injection moulded plastic component 2. This produces a space 4, which in the case of a cylindrical ram 3 forms an annulus. This annular space 4 is initially bounded by the surface 8 of the injection-moulded component 2, the outer face 6A of the sleeve 6, the boundary 6C of the sleeve 6, and the outer casing of the ram 3.

In the next step of the method, the ram 3 is heated and is forced under pressure into the injection-moulded component 2. It is pressed in up to a depth which does not pass through the entire thickness D of the injection-moulded component 2. The press-in depth, however, is more than half the thickness D/2 of the injection-moulded plastic component 2. As a result, the ram 3 penetrates the injection-moulded plastic component 2 and passes through the centre axis 7 of the injection-moulded plastic component 2.

The introduction of heat by the ram 3 causes the material of the injection-moulded plastic component 2 to melt, and it is displaced primarily upwards as a result of the pressure of the ram 3 and of the limited melting zone in the injection moulded plastic component 2. The melting zone forms only a narrow ring around the heated ram and does not extend far into the injection-moulded plastic component 2. As a result, the material enters the annular space 4 intended for it.

In the next step of the method, the ram 3 is no longer heated, and may even be subjected to cooling. The ram 3 is subsequently removed upwards from the injection-moulded plastic component 2. Because the forming with the ram 3 occurs in the bottom mould half 5, the outer surface 10 of the injection-moulded plastic component 2 always remains in contact with the bottom mould half 5. This minimizes effects of a minimal introduction of temperature, and the surface is cooled by the bottom mould half and stabilized, in order thus to preserve an optimum surface on the surface lying to the outside of the vehicle.

The injection-moulded plastic component 2 can be subsequently removed from the mould. It now has the shape dictated by the injection mould, and has a recess adapted to the shape of a sensor to be installed. An annular bead has been formed as a result of the treatment with the ram, and this bead serves as a frame and for fastening a sensor to be installed.

The shape of the respective recess in the injection-moulded plastic component 2 is determined by the ram 3 used and by the sleeve 6. The ram 3 and the sleeve 6 are provided with coatings which part easily from the material. As a result, the extraction of filaments of material during raising is prevented.

The temperature profile, the rate of lowering of the ram, the force of the ram and the optimum times for dwelling and cooling are adapted exactly to each specific case of use.

What is claimed is:

1. A method for producing an injection-moulded plastic component made of a plastic having at least one recess for accommodating sensors by forming a bead on the surface of the injection-moulded plastic component, having the following steps:
producing the injection-moulded plastic component in a mould having top and bottom mould halves;
raising the top mould half and introducing a thermoregulatable ram which is guided in a sleeve;
placing the sleeve with integrated annular space on the surface of the injection-moulded plastic component;
pressing the thermoregulated ram into the surface of the injection-moulded plastic component to form an annular bead in the annular space by displacing melting material of the injection-moulded plastic component in the direction of the annular space; and
cooling the ram and raising it from the surface.

2. The method according to claim 1, wherein the press-in depth of the ram is not less than half the thickness D of the injection-moulded plastic component.

3. The method according to claim 1, wherein the annular space is bounded by the surface of the injection-moulded plastic component, the outer face of the sleeve, the boundary of the sleeve, and the outer casing of the ram.

4. The method according to claim 1, where the annular space and the sleeve and the ram exhibit any desired contour of the annular space.

5. The method according to claim 1, further comprising producing the injection-moulded plastic component having at least one recess for accommodating sensors and an annular bead raised relative to the surface of the injection-moulded component defined by the upper mould-half.

6. A method for producing an injection-moulded plastic component, the method comprising the steps of:
providing a mould having top and bottom mould halves and defining a mould cavity therebetween;

producing a first shape of an injection-molded plastic component, wherein the first shape corresponds to the mould cavity;

placing a ram and a sleeve against an upper surface of the first shape, wherein the sleeve includes an inner portion and an outer portion, wherein the outer portion extends further downward relative to the inner portion and contacts the upper surface; wherein the ram is disposed within the inner portion and contacts the sleeve;

defining a space bounded by the upper surface of the first shape, the outer portion of the sleeve, the inner portion of the sleeve, and the ram;

heating the ram and pressing the ram downward into the upper surface of the first shape and melting material of the injection-moulded plastic component; and displacing melted material of the injection-moulded plastic component upward into the space and defining a second shape of the injection-moulded plastic component.

7. The method according to claim 6, further comprising raising the top mould half away from the first shape and leaving the first shape in the lower mould half.

8. The method according to claim 7, further comprising thermoregulating the lower mould half and reducing a rate of cooling of the first shape.

9. The method according to claim 6, wherein the ram and outer portion of the sleeve are cylindrical and the space is an annular space.

10. The method according to claim 6, further comprising pressing the ram into the first shape at a depth more than half a thickness of the first shape and less than a full thickness of the first shape.

11. The method according to claim 10, further comprising defining a bead of material of the second shape that is raised relative to the upper surface of the first shape and defining a cavity of the second shape that is recessed relative to the upper surface of the first shape.

12. The method according to claim 11, further comprising placing a sensor within the cavity and fastening the sensor to the bead.

13. The method according to claim 6, further comprising a defining melting zone in the first shape in the shape of a narrow ring around the ram.

14. The method according to claim 6 further comprising cooling the ram and retracting the ram upward after displacing the melted material.

15. The method according to claim 6, wherein the outer portion of the sleeve defines an inner cylindrical face, the inner portion of the sleeve defines an annular horizontal face, and the ram defines an outer cylindrical face, thereby defining an annular space radially outward relative to the ram and radially inward relative to the outer portion.

16. A method of producing a component having a recess and a raised annular bead for mounting a sensor therewith, the method comprising:

performing a one-shot injection-moulding process a defining a first shape of the component between a first mould half and second mould half;

retracting the first mould half from the first shape and retaining the first shape on the second mould half;

introducing a ram and a sleeve into contact with the first shape of the component;

defining an annular space around the ram that is bounded by the sleeve, the ram, and the first shape of the component;

heating the ram and creating a ring-shape melting zone around the ram to create melted material of the component;

pressing the ram into the component and forcing the melted material into the annular space; and forming a recessed cavity and a raised annular bead of the component relative to the first shape.

17. The method according to claim 16, further comprising pressing the ram beyond a half-way depth of the first shape of the component.

18. The method according to claim 16, wherein the raised annular bead and the recessed cavity corresponds to a contour of the annular space defined by the sleeve, the ram, and the first shape of the component.

19. The method according to claim 16, wherein the sleeve includes an inner portion and an outer portion, wherein the inner portion is raised relative to the outer portion and defines a horizontal boundary, wherein the horizontal boundary is spaced from a surface of the first shape of the component when the sleeve and ram are introduced into contact with the first shape.

20. The method according to claim 16, wherein the annular bead and a remainder of the component are part of a unitary homogenous structure of the material of the component.

* * * * *